(12) United States Patent
Gougeon et al.

(10) Patent No.: US 10,889,291 B2
(45) Date of Patent: Jan. 12, 2021

(54) METHOD FOR AUTONOMOUSLY PARKING A MOTOR VEHICLE WITH INTERIOR MONITORING, DRIVER ASSISTANCE SYSTEM AS WELL AS MOTOR VEHICLE

(71) Applicant: VALEO Schalter und Sensoren GmbH, Bietigheim-Bissingen (DE)

(72) Inventors: Philippe Gougeon, Bietigheim-Bissingen (DE); Nicolas Jecker, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 232 days.

(21) Appl. No.: 15/781,390

(22) PCT Filed: Nov. 28, 2016

(86) PCT No.: PCT/EP2016/079029
§ 371 (c)(1),
(2) Date: Jun. 4, 2018

(87) PCT Pub. No.: WO2017/093196
PCT Pub. Date: Jun. 8, 2017

(65) Prior Publication Data
US 2018/0345954 A1   Dec. 6, 2018

(30) Foreign Application Priority Data
Dec. 4, 2015 (DE) .................. 10 2015 121 113

(51) Int. Cl.
*B60W 30/06* (2006.01)
*G07C 5/00* (2006.01)
(Continued)

(52) U.S. Cl.
CPC ............ *B60W 30/06* (2013.01); *B60W 50/14* (2013.01); *B62D 15/027* (2013.01);
(Continued)

(58) Field of Classification Search
CPC ................. B60W 30/06; B60W 50/14; B60W 2050/143; B62D 15/027; B62D 15/0285;
(Continued)

(56) References Cited

U.S. PATENT DOCUMENTS 8,768,292 B2   7/2014 Welch
9,041,523 B1   5/2015 Birdis et al.
(Continued)

FOREIGN PATENT DOCUMENTS

DE   10 2008 027692 A1   12/2009
EP      2 617 627 A2      7/2013
(Continued)

OTHER PUBLICATIONS

International Search Report issued in PCT/EP2016/079029 dated Feb. 2, 2017 (3 pages).
(Continued)

*Primary Examiner* — Krishnan Ramesh
(74) *Attorney, Agent, or Firm* — Osha Bergman Watanabe & Burton LLP

(57) ABSTRACT

The invention relates to a method for autonomously parking a motor vehicle (1), in which the motor vehicle (1) is positioned in a start position (5), wherein the start position (5) is associated with a parking area (7) with a plurality of parking spaces (6), by means of a parking control device (4), one of the parking spaces (6) is selected for parking for the motor vehicle (1) and a trajectory (12) for autonomously moving the motor vehicle (1) from the start position (5) to the selected parking space (6) is determined, wherein interior data describing an interior (16) of the motor vehicle (1) is received by means of the parking control device (4), and it is examined based on the received interior data if a living entity is in the interior (16) of the motor vehicle (1), and the moving of the motor vehicle (1) along the determined trajectory (12) remains undone if the living entity is in the interior (16).

11 Claims, 2 Drawing Sheets

Figure 1:
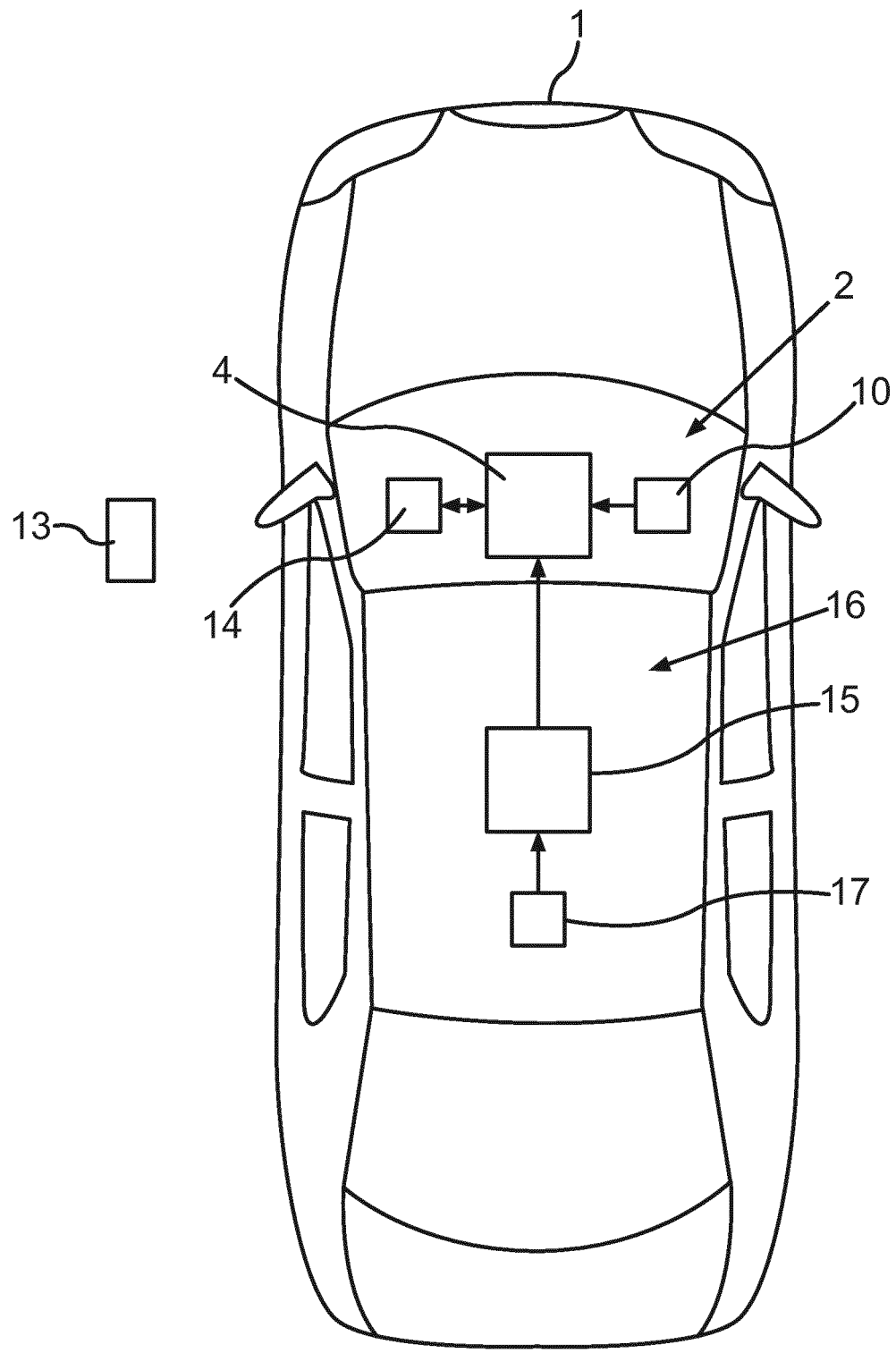

(51) Int. Cl.
  *B62D 15/02* (2006.01)
  *B60W 50/14* (2020.01)
  *G05D 1/00* (2006.01)
  *G06K 9/00* (2006.01)
  *G08G 1/14* (2006.01)
(52) U.S. Cl.
  CPC ....... *B62D 15/0285* (2013.01); *G05D 1/0088* (2013.01); *G06K 9/00838* (2013.01); *G07C 5/00* (2013.01); *B60W 2050/143* (2013.01); *G05D 2201/0213* (2013.01); *G08G 1/143* (2013.01); *G08G 1/146* (2013.01)
(58) Field of Classification Search
  CPC .... G05D 1/0088; G06K 9/00838; G07C 5/00; G08G 1/146
  USPC .......................................................... 701/23
  See application file for complete search history.

(56) References Cited

U.S. PATENT DOCUMENTS

| | | | | |
|---|---|---|---|---|
| 2016/0378104 A1* | 12/2016 | Hiei | ................ | B60Q 9/00 701/2 |
| 2017/0088098 A1* | 3/2017 | Frank | ................ | G06K 9/00362 |
| 2017/0226764 A1* | 8/2017 | Nussbaum | ................ | E04H 6/18 |
| 2017/0254654 A1* | 9/2017 | Nordbruch | ....... | G08G 1/096844 |
| 2017/0309177 A1* | 10/2017 | Hoffmann | ............ | G01C 21/362 |
| 2018/0037262 A1* | 2/2018 | Imai | ................ | B60W 30/08 |
| 2018/0039844 A1* | 2/2018 | Nordbruch | ............ | B60N 2/002 |
| 2018/0286240 A1* | 10/2018 | Harai | ................ | B60W 30/06 |

FOREIGN PATENT DOCUMENTS

| | | |
|---|---|---|
| EP | 2 687 410 A1 | 1/2014 |
| JP | 2006-023862 A | 1/2006 |
| JP | 2008-174192 A | 7/2008 |
| JP | 2015-016803 A | 1/2015 |
| JP | 2015-153145 A | 8/2015 |
| WO | 2015/005185 A2 | 1/2015 |
| WO | 2015/143153 A1 | 9/2015 |

OTHER PUBLICATIONS

Written Opinion of the International Searching Authority issued in PCT/EP2016/079029 dated Feb. 2, 2017 (5 pages).
Notification of Reason for Rejection in corresponding Japanese Application No. 2018-528586, dated Jul. 16, 2019 (6 pages).
Notice of Preliinary Rejection in corresponding Korean Application No. 2018-7018899, dated Sep. 5, 2019 (11 pages).

* cited by examiner

METHOD FOR AUTONOMOUSLY PARKING A MOTOR VEHICLE WITH INTERIOR MONITORING, DRIVER ASSISTANCE SYSTEM AS WELL AS MOTOR VEHICLE

The present invention relates to a method for autonomously parking a motor vehicle, in which the motor vehicle is positioned in a start position, wherein the start position is associated with a parking area with a plurality of parking spaces, by means of a parking control device, one of the parking spaces is selected for parking for the motor vehicle and a trajectory for autonomously moving the motor vehicle from the start position to the selected parking space is determined. Moreover, the present invention relates to a driver assistance system for a motor vehicle. Finally, the present invention relates to a motor vehicle.

Presently, the interest is in particular directed to driver assistance systems, which serve for assisting the driver in driving the motor vehicle. Therein, driver assistance systems are known in different embodiments from the prior art. For example, driver assistance systems are used, which assist the driver in parking into a parking space. Furthermore, so-called valet park systems have been presented, which serve for autonomously parking the motor vehicle into a parking space of a parking area with multiple parking spaces. Hereto, the driver can for example place the motor vehicle in a start position. Subsequently, he can leave the motor vehicle and start the autonomous parking procedure by means of an operating device external to motor vehicle. Subsequently, the motor vehicle is autonomously moved from the start position into a selected parking space. When the driver again needs the motor vehicle, he can emit a corresponding control signal by means of the operating device external to motor vehicle, as a result of which the motor vehicle is again autonomously moved from the parking space back to the start position.

Moreover, driver assistance systems are known from the prior art, by means of which the interior of the motor vehicle can be monitored. Herein, it can for example be examined if a living entity is in the interior of the motor vehicle after the motor vehicle has been placed. Such a system is for example described in U.S. Pat. No. 9,041,523 B1.

It is the object of the present invention to demonstrate a solution, how a method for autonomously maneuvering a motor vehicle can be more securely and reliably configured.

According to the invention, this object is solved by a method, by a driver assistance system as well as by a motor vehicle having the features according to the respective independent claims. Advantageous developments of the present invention are the subject matter of the dependent claims, of the description and of the figures.

A method according to the invention serves for autonomously parking a motor vehicle. Herein, the motor vehicle is positioned in a start position, wherein the start position is associated with a parking area with a plurality of parking spaces. Further, by means of a parking control device, one of the parking spaces is selected for the motor vehicle for parking the motor vehicle and a trajectory for autonomously moving the motor vehicle from the start position to the selected parking space is determined. Furthermore, interior data describing an interior of the motor vehicle is received by means of the parking control device and it is examined based on the received interior data if a living entity is in the interior of the motor vehicle. Therein, the moving of the motor vehicle along the determined trajectory remains undone if the living entity is in the interior.

Presently, the motor vehicle is to be parked autonomously or automatically. The motor vehicle can be maneuvered into a parking space with the aid of a driver assistance system. This driver assistance system is in particular formed as a so-called valet park system. The motor vehicle can also be moved into the parking space by means of a transport system, for example a conveyor or a robot. For performing the autonomous parking procedure, the motor vehicle can first be positioned in a start position. This start position is associated with a parking area. This parking area can for example be a part of a public or private parking lot. This parking area can also be disposed in a parking garage or can be part of a parking garage. The parking area can also be disposed in an automatic parking system or can be part of a automatic parking system. The parking area comprises a plurality of parking spaces. The parking space describes an area for parking the motor vehicle. The parking space can also be a retaining area, in which the motor vehicle is moved automatically. By means of the parking control device, first, one of the parking spaces is selected for parking for the motor vehicle. Hereto, for example, corresponding data can be received from a managing system of the parking area by the parking control device. This data can for example describe, which parking spaces of the parking area are free. In addition, this data can include information to the position of the free parking areas. Moreover, this data received by means of the parking control device can have information about the geometric configuration of the parking area. It can for example be formed in the manner of a digital map. Based on the received data, the parking control device can then select one of the free parking spaces and determine a trajectory, along which the motor vehicle is moved from the start position to the selected parking space.

According to the invention, it is now provided that interior data is additionally received by means of the parking control device, which describes the interior of the motor vehicle. In particular, this interior data describes if a living entity, for example a human or an animal, is in the interior of the motor vehicle. Based on the received interior data, it is now examined by means of the parking control device if one or more living entities are in the interior of the motor vehicle. This examination is in particular effected before the autonomous parking maneuver is started or before the motor vehicle is autonomously maneuvered along the determined travel trajectory. If it is recognized by means of the parking control device that a living entity is in the interior of the motor vehicle, the autonomous parking procedure is not performed. In other words, the movement of the motor vehicle along the determined travel trajectory remains undone. Thus, the motor vehicle is in particular not moved away from the start position. Thus, the parking maneuver can be prevented from being started in reliable manner if living entities left behind or forgotten are in the interior of the motor vehicle. Thereby, the living entity located in the interior of the motor vehicle can additionally be prevented from remaining in the vehicle after the performed autonomous parking maneuver and optionally being enclosed there. Thereby, it can be ensured that the living entity remaining in the motor vehicle suffers health damages in particular at high environmental temperatures. Thereby, an autonomous parking maneuver can be more securely and reliably performed in particular in connection with a so-called valet park system.

In an embodiment, a warning signal is output by means of the parking control device if the living entity is in the interior. In particular, the warning signal is output to the driver of the motor vehicle. Presently, that person is to be understood as the driver, who has maneuvered the motor vehicle to the start position and who starts the autonomous parking maneuver. Here, the driver can for example be located outside of the motor vehicle and start the autonomous parking maneuver by means of an operating device external to motor vehicle, for example a smart phone. The warning signal can for example be acoustically, optically or haptically output to the driver. This warning signal can include information that a living entity is in the motor vehicle. In addition, the warning signal can include that information that the autonomous parking maneuver is not performed since a living entity is still in the interior. Thus, the driver of the motor vehicle can initiate corresponding steps and for example remove the living entity from the interior of the motor vehicle. Subsequently, the autonomous parking maneuver can be started.

Furthermore, it is advantageous if the warning signal is transmitted from the parking control device to an operating device external to motor vehicle. As already explained, an operating device external to motor vehicle can be used to output a start signal for the autonomous parking procedure. This start signal can be transmitted from the operating device external to motor vehicle to the parking control device. Presently, it is in particular provided that the warning signal is transmitted from the parking control device to this operating device external to motor vehicle and the warning signal is then output by means of the operating device external to motor vehicle. Thus, it is immediately indicated to the driver that the autonomous parking maneuver cannot be performed since a living entity is in the motor vehicle.

In a further configuration, the interior data received by the parking control device describes a position of the living entity in the interior of the motor vehicle and/or the living entity. The interior data can include information about if and how many living entities are in the interior of the motor vehicle. In addition, the interior data can describe, in which position in the interior of the motor vehicle the living entity is located. The interior data can also describe the living entity itself. For example, the interior data can describe if the living entity is a human, in particular a child. Further, the interior data can describe if the living entity is an animal, for example a dog. Thus, besides recognition of the presence of the living entity, identification of the living entity can also be performed.

Furthermore, it is advantageous if the interior data is determined by means of an interior control device and transmitted to the parking control device, wherein the interior data is determined based on sensor data by means of the interior control device, which is provided by at least one interior sensor. Besides the parking control device, which serves for controlling the autonomous parking maneuver, an interior control device can also be provided, by means of which the interior of the motor vehicle can be monitored. The parking control device and the interior control device can be connected by a corresponding data bus or wireless for data transmission. The interior control device is in turn connected to at least one interior sensor, by which sensor data is provided, which describes the interior of the motor vehicle. Based on this sensor data, the interior control device can determine the interior data and transmit it to the parking control device. Therein, it can for example be provided that the interior control device continuously transmits the interior data to the parking control device. A storage element can also be disposed between the interior control device and the parking control device, on which the interior data is buffered. Thus, a connection between the interior control device and the parking control device is provided for the first time. Thus, the parking control device can use the interior data and evaluate it before the start of the autonomous parking maneuver.

In an embodiment, the sensor data provided by the at least one interior sensor describes an occupancy of the seats of the motor vehicle, in particular of the backseats. In this case, the at least one interior sensor can for example be formed as a sensor for seat occupancy recognition. Such a sensor can for example be a force sensor or a pressure sensor, which is integrated in the seat, and by which it can be sensed if a living entity is on the seat. Such seat occupancy sensors are for example used to output a corresponding signal if it has been recognized that the seat is occupied, but the occupant of this seat is unbelted. Further, such seat occupancy sensors are usually used in connection with the control of occupant protection devices such as airbags. According to the Euro NCAP, it is for example provided that such seat occupancy sensors are also employed on the backseats. These seat occupancy sensors can then be used to recognize if a living entity is on the backseat. The backseats cannot be directly seen by the driver, and therefore there is the risk that a living entity located on the backseat is left behind. This can be prevented by such a seat occupancy sensor as the interior sensor.

The interior sensor can also be adapted to check the seatbelts associated with the respective seats. Thus, it can for example be checked if a seatbelt is locked. If this is the case, it can be assumed with high certainty that a living entity is on this seat, with which the locked seatbelt is associated. The interior sensor can also be disposed on a seatbelt. Here, it can acquire the breathing of the belted living entity or the temperature of the belted living entity.

In a further embodiment, the sensor data provided by the at least one interior sensor describes an occupancy of a child car seat in the interior of the motor vehicle. By the interior sensor, it can basically be recognized if a child car seat is disposed in the motor vehicle or on a seat of the motor vehicle. By the interior sensor, it can also be recognized if an infant carrier is on one of the seats. Furthermore, it can be provided that an interior sensor is used, which is for example adapted to recognize an occupancy of the child car seat. Thus, it can be recognized if a child is in the child car seat. Such a sensor can for example be a force or a pressure sensor. In addition, a sensor can be used, which for example recognizes the breathing of the child. Thus, children can in particular be prevented from being left behind in the car. In particular with children left behind, there is increased risk since they for example cannot leave the motor vehicle by themselves. If the children nevertheless can leave the motor vehicle, there is the risk that they are injured on the parking area.

Furthermore, it is advantageous if the sensor data provided by the at least one interior sensor describes a trunk of the motor vehicle. Presently, the trunk is understood as a part of the interior of the motor vehicle. It can also be provided that a living entity is in the trunk of the motor vehicle. The living entity can for example be an animal, in particular a dog. Based on the sensor data of the interior sensor, it can now be recognized if an animal has been left behind in the trunk. It can also be provided that animals are in corresponding transport containers or boxes. A corresponding sensor can also be provided within such a box, by which the presence of a living entity in this box can be recognized. Thereby, a living entity can be prevented from being forgotten in the trunk in reliable manner.

Furthermore, it is advantageous if the sensor data provided by the at least one interior sensor includes image data of the interior. In this case, the at least one interior sensor can for example include a camera. Image data of the interior can be provided by this camera. In addition, the interior sensor can include a corresponding image recognition unit, by which living entities can be recognized. Basically, it can also be provided that infrared captures are provided to the interior sensor, based on which the living entity can be recognized due to its temperature in the interior. Generally, temperature sensors can also be used to recognize the living entity in the interior. The interior sensor can also be adapted to recognize a position of the living entity in the interior of the motor vehicle. Herein, the interior sensor can include a corresponding distance sensor. Thus, the presence of the living entity in the interior can be recognized and the living entity additionally can be identified.

In one embodiment, the parking control device is part of a driver assistance system of the motor vehicle and a drive motor, a steering and/or a brake system of the motor vehicle is controlled by means of the parking control device for moving the motor vehicle. In this case, the motor vehicle is moved by means of the driver assistance system along the predetermined trajectory. The parking control device can be constituted by an electronic control unit (ECU) of the motor vehicle.

In an alternative embodiment, the parking control device is part of a transport system of the parking space and the transport system is controlled by means of the parking control device for moving the motor vehicle. The motor vehicle can be moved by the transport system along the trajectory. Here, the parking area may be associated with an automatic parking system. When the motor vehicle is parked at the starting position, it can for example be positioned on an appropriate platform, which is part of the transport system. The transport system can comprise a conveyor belt, by means of which the motor vehicle is moved. The transport system may also include a lifting device for moving the motor vehicle. The transport system can also be designed in the manner of a paternoster. Furthermore, a corresponding robot can be used to move the motor vehicle. In this case, the interior data can be for example transferred wireless from the motor vehicle to the parking control device of the transport system. If it is detected by means of the parking control device that a living entity is in the interior of the motor vehicle, the moving of the motor vehicle by means of the transport system remains undone.

A driver assistance system according to the invention for a motor vehicle is adapted to perform a method according to the invention. The driver assistance system can include the parking control device and the interior control device, which are connected by a corresponding data line, for example a vehicle data bus, for data transmission. In addition, the driver assistance system can include the at least one interior sensor. This interior sensor is connected to the interior control device for data transmission.

A motor vehicle according to the invention includes a driver assistance system according to the invention. In particular, the motor vehicle is formed as a passenger car.

The preferred embodiments presented with respect to the method according to the invention and the advantages thereof correspondingly apply to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Now, the invention is explained in more detail based on preferred embodiments as well as with reference to the attached drawings.

Figure 2:
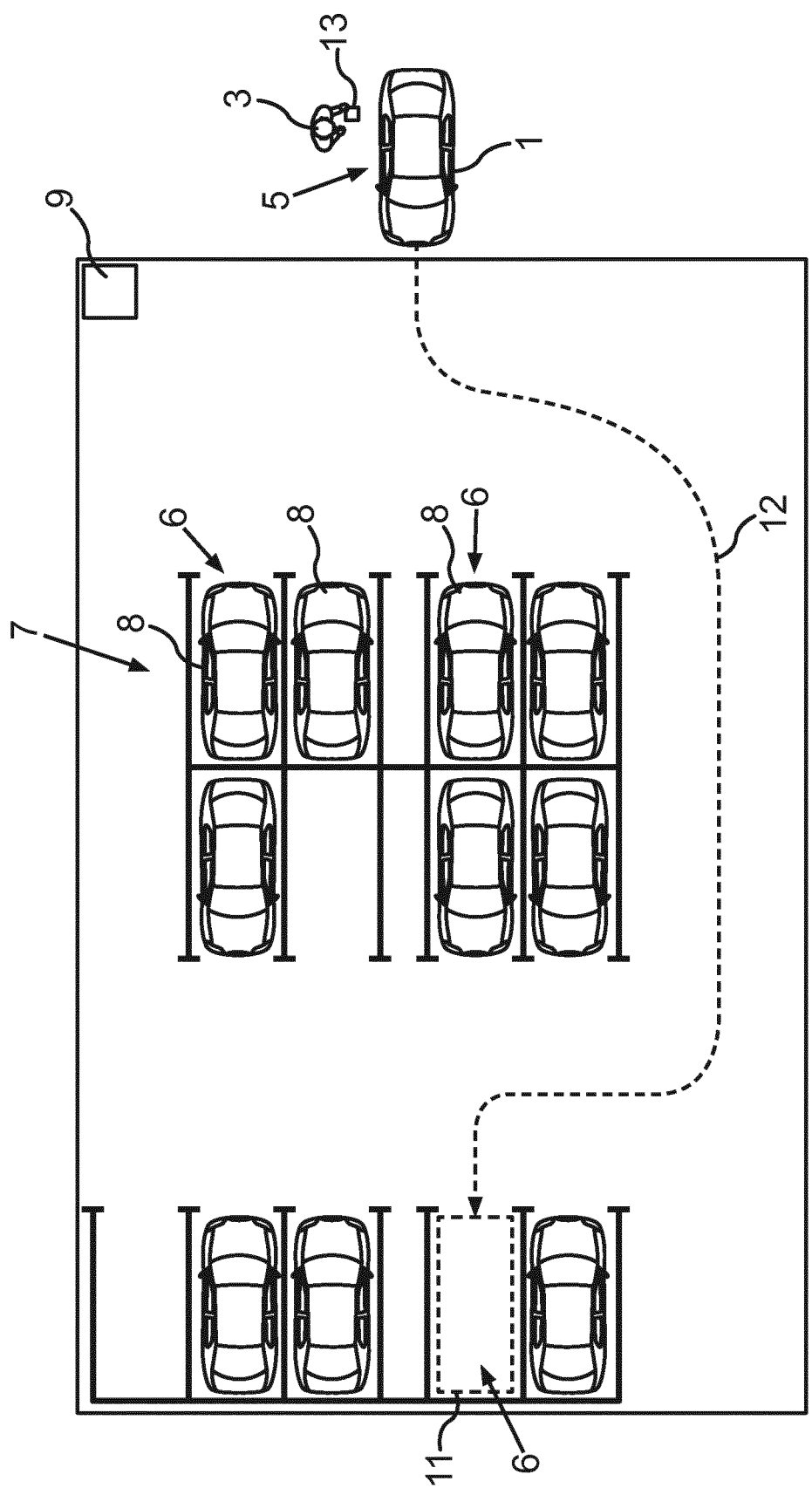

There show:

FIG. 1 a motor vehicle according to an embodiment of the present invention, which has a driver assistance system; and FIG. 2 the motor vehicle according to FIG. 1, which is in a start position for autonomously parking into a parking space of a parking area.

In the figures, identical and functionally identical elements are provided with the same reference characters.

FIG. 1 shows a motor vehicle 1 according to an embodiment of the present invention in a plan view. The motor vehicle 1 includes a driver assistance system 2, which serves for assisting a driver 3 in driving the motor vehicle 1. In particular, the driver assistance system 2 serves for autonomously parking the motor vehicle 1 into a parking space. The driver assistance system 2 includes a parking control device 4, which serves for autonomously parking the motor vehicle 1. In particular, the parking control device 4 serves for performing a so-called valet park maneuver.

The principle of such a valet park maneuver is schematically illustrated in FIG. 2. Hereto, the motor vehicle 1 is first placed in a start position 5. Hereto, the driver 3 can first maneuver the motor vehicle 1 into the start position 5. Starting from this start position 5, now, the motor vehicle 1 is to be parked into a parking space 6 of a parking area 7. Presently, the parking area 7 is associated with a parking lot. The parking area 7 includes a plurality of parking spaces 6, in which parked vehicles 8 are partially located. A corresponding managing system 9 is associated with the parking area 7, by which information can be provided, which one of the parking spaces 6 is free and which position these free parking spaces 6 have in the parking area 7. The information can be transmitted from this managing system 9 to a receiving unit 10 of the motor vehicle 1 or of the driver assistance system 2 (see FIG. 1). This information from the managing system 9 is received by the receiving unit 10 and transmitted to the parking control device. By means of the parking control device 4, one of the parking spaces can then be selected. Presently, the selected parking space 6 is highlighted by the dashed rectangle 11 in FIG. 2. Further, a travel trajectory 12 is determined by means of the parking control device 4, along which the motor vehicle 1 is moved from the start position 5 to the selected parking space 6.

The autonomous parking procedure can be initiated by a corresponding operating input of the driver 3. After placing the motor vehicle 1 in the start position 5, the driver 3 leaves the motor vehicle 1. By means of an operating device 13 external to motor vehicle, which can for example be provided by a smart phone or the like, the driver 3 can perform an operating input and thus start the autonomous parking maneuver. The driver assistance system 2 further includes a communication unit 14, by means of which data can be received from the operating device 13 external to motor vehicle. The communication unit 14 is additionally connected to the parking control device 4 for data transmission. Thus, as a result of the operating input of the driver 3, the autonomous parking procedure can be started and the motor vehicle 1 can be autonomously maneuvered along the travel trajectory 12.

Moreover, the driver assistance system 2 includes an interior control device 15. Interior data can be provided by the interior control device 15, which describes an interior 16 of the motor vehicle 1. For this purpose, the interior control device 15 is connected to an interior sensor 17 for data transmission. Presently, for the sake of simplicity, only one interior sensor 17 is illustrated. Basically, the driver assistance system 2 can have a plurality of interior sensors 17. By these interior sensors 17, it can then be examined if a living entity is in the interior 16 of the motor vehicle 1.

The interior sensor 17 can for example be formed as a seat occupancy sensor. Thus, it can be determined if a living entity is on one of the seats of the motor vehicle 1. In addition, the interior sensor 17 can be adapted to examine the seatbelts in the motor vehicle 1. If a seatbelt is for example locked, it can be assumed that a living entity is in the seat associated with the seatbelt. Further, the interior sensor 17 can be adapted to acquire a temperature in the interior 16 of the motor vehicle 1 or in the area of the seats. The interior sensor 17 can also be disposed directly on one of the seatbelts. Here, the interior sensor 17 can be adapted to recognize breathing, a pulse beat or the heat generated by the living entity. It can also be examined by the interior sensor 17 if a living entity, for example an animal, is in the trunk of the motor vehicle 1. In particular, it can be examined by the interior sensor 17 if for example a child is in a child car seat of the motor vehicle 1. It can also be provided that the interior sensor 17 includes a corresponding camera, by means of which image data of the interior 16 can be provided.

The interior control device 15 receives the sensor data from the at least one interior sensor 17. By evaluating this sensor data, the interior control device 15 can provide the interior data describing the interior 16 and in particular describing if a living entity is in the interior 16. This interior data is transmitted from the interior control device 15 to the parking control device 4.

Before performing the autonomous parking maneuver, it is examined by means of the parking control device 4 based on the interior data if the living entity is in the interior 16. If this is the case, the autonomous parking maneuver is not performed. Thus, the motor vehicle 1 is not moved along the travel trajectory 12. In this case, a corresponding warning signal can additionally be output by means of the parking control device 4. This warning signal can be transmitted from the parking control device 4 to the communication unit 14 and from it to the operating device 13 external to motor vehicle. Thus, the warning signal can be output by means of the operating device 13 external to motor vehicle. Thus, the driver 3 is made aware of the fact that the autonomous parking maneuver is not performed since a living entity is in the interior 16. In this manner, a living entity can be prevented from being left behind in the interior of the motor vehicle 1 in the autonomous parking maneuver.

The method described above can also be applied to parking areas 7, in which the motor vehicle 1 is moved by means of a transport system. In this case, the parking control device 4 would be associated with the transport system.

The invention claimed is:

1. A method for autonomously parking a motor vehicle, comprising:
    positioning the motor vehicle in a start position;
    wherein the start position is associated with a parking area with a plurality of parking spaces by a parking control device,
    selecting one of the plurality of parking spaces for parking for the motor vehicle; and
    determining a trajectory for autonomously moving the motor vehicle from the start position to the selected parking space,
    wherein:
    interior data describing an interior of the motor vehicle is received by the parking control device,
    the data is examined based on the received interior data if a living entity is in the interior of the motor vehicle,
    the motor vehicle remains unmoved in the start position if the living entity is in the interior,
    the interior data is determined based on sensor data of at least one interior sensor of an interior control device, and
    the sensor data describes a trunk of the motor vehicle.

2. The method according to claim 1, wherein a warning signal is output by means of the parking control device if the living entity is in the interior.

3. The method according to claim 2, wherein the warning signal is transmitted from the parking control device to an operating device external to motor vehicle.

4. The method according to claim 1, wherein the interior data received from the parking control device describes a position of the living entity in the interior and/or describes the living entity.

5. The method according to claim 1, wherein the sensor data provided by the at least one interior sensor describes an occupancy of the backseats of the motor vehicle.

6. The method according to claim 1, wherein the sensor data provided by the at least one interior sensor describes an occupancy of a child car seat in the interior of the motor vehicle.

7. The method according to claim 1, wherein the sensor data provided by the at least one interior sensor includes image data of the interior.

8. The method according to claim 1, wherein the parking control device is part of a driver assistance system of the motor vehicle and a drive motor, a steering and/or a brake system of the motor vehicle is controlled by means of the parking control device for moving the motor vehicle.

9. The method according to claim 1, wherein the parking control device is part of a transport system of the parking space and the transport system is controlled by means of the parking control device for moving the motor vehicle.

10. A driver assistance system for a motor vehicle, which is configured to perform a method according to claim 1.

11. A motor vehicle with a driver assistance system according to claim 10.

* * * * *